United States Patent
LaFrance et al.

(10) Patent No.: US 8,830,083 B2
(45) Date of Patent: Sep. 9, 2014

(54) UTILITY METER WITH TEMPERATURE BASED ACTUATION OF A REMOTE DISCONNECT SWITCH

(75) Inventors: Ryan Marc LaFrance, Atlanta, GA (US); Scott M. Shill, Atlanta, GA (US); Jerry Wagner, Atlanta, GA (US); Bruce Tomson, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 696 days.

(21) Appl. No.: 13/115,145

(22) Filed: May 25, 2011

(65) Prior Publication Data

US 2012/0299745 A1 Nov. 29, 2012

(51) Int. Cl.
*G08C 19/00* (2006.01)
*G01D 4/00* (2006.01)

(52) U.S. Cl.
CPC .............. *G01D 4/004* (2013.01); *Y04S 20/322* (2013.01); *Y02B 90/242* (2013.01)
USPC ............. 340/870.17; 340/870.02; 340/870.16

(58) Field of Classification Search
USPC ........................... 340/870.02, 870.16, 870.17
See application file for complete search history.

(56) References Cited

U.S. PATENT DOCUMENTS

| 4,377,948 A | 3/1983 | Tenney, Jr. et al. |
| 4,833,888 A * | 5/1989 | Kerner et al. ................. 62/3.3 |
| 2002/0105435 A1 | 8/2002 | Yee et al. |
| 2008/0094248 A1 | 4/2008 | Lakich |
| 2011/0029266 A1 * | 2/2011 | Lee ................................ 702/64 |

OTHER PUBLICATIONS

Office Action issued in connection with NZ Patent Application No. 600147, May 29, 2012.
Search Report issued in connection with EP Application No. 121685356.9, Oct. 10, 2012.

* cited by examiner

*Primary Examiner* — Andrew Bee
(74) *Attorney, Agent, or Firm* — Sutherland Asbill & Brennan LLP

(57) ABSTRACT

The present application provides a utility meter. The utility meter may include a processor with a predetermined temperature range, a remote disconnect switch in communication with the processor, and a temperature sensor in communication with the processor. The processor opens the remote disconnect switch when the temperature sensor senses a temperature that exceeds the predetermined temperature range.

17 Claims, 5 Drawing Sheets

UTILITY METER WITH TEMPERATURE BASED ACTUATION OF A REMOTE DISCONNECT SWITCH

TECHNICAL FIELD

The present application relates generally to a utility meter and more particularly relates to a utility meter with an internal temperature sensor for temperature-based actuation of a remote disconnect switch in the presence of possibly dangerous conditions.

BACKGROUND OF THE INVENTION

A wide variety of utility meters are configured to transmit and receive messages, instructions, and other types of information to one or more recipients such as a data collection server or a utility service provider. One such function is known as a "remote disconnect", which allows the entire electrical service to be switched off at the utility meter remotely. Specifically, instructions received by the utility meter may trigger a remote disconnect switch so as to disconnect the electrical service until instructions are received otherwise. Preferably, such a remote disconnect switch may be situated upstream from a load side and downstream from a meter line side. A communications link may provide information regarding the actuation of such a remote disconnect switch. Reconnection functionality also may be used.

Faulty contacts or contacts not well seated in such a remote disconnect switch within a utility meter can decrease the surface area of the copper that passes the current therein. This decrease in surface area may greatly increase the resistance therein and, hence, cause a large temperature increase along a gradient. Such a large temperature increase may present the possibility of damage to the utility meter and possibly to adjacent structures.

There is therefore a desire therefore for an improved utility meter design that can accommodate unusual internal temperature increases in a safe and efficient manner. Specifically, there is a desire for improved remote disconnect switch configurations and operations that may avoid such large temperature increases and the associated possibility of damage caused thereby.

SUMMARY OF THE INVENTION

The present application and the resultant patent thus provide a utility meter. The utility meter may include a processor with a predetermined temperature range, a remote disconnect switch in communication with the processor, and a temperature sensor in communication with the processor. The processor opens the remote disconnect switch when the temperature sensor senses a temperature that exceeds the predetermined temperature range.

The present application and the resultant patent further provide a method of operating a utility meter with a remote disconnect switch. The method may include the steps of sensing the temperature about the remote disconnect switch with one or more temperature sensors, comparing the sensed temperatures with a predetermined threshold range, and issuing a disconnect signal to the remote disconnect switch if the sensed temperatures exceed the predetermined threshold range.

The present application and the resultant patent further provide a utility meter. The utility meter may include a remote disconnect switch positioned about a base, a temperature sensor positioned about the base, and the remote disconnect switch and the temperature sensor in communication via, a temperature monitoring circuit. The remote disconnect switch opens when the temperature sensor senses a temperature that exceeds a predetermined temperature range.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
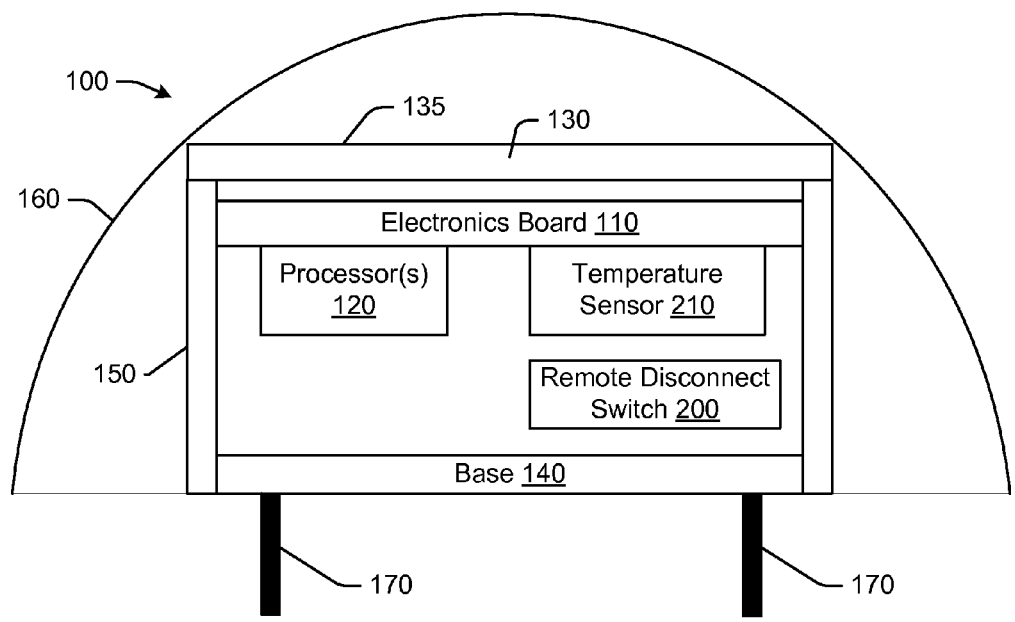
FIG. 1 is a side view of a utility meter as may be described herein.

Referring now to the drawings, in which like numerals refer to like elements throughout the several views, FIG. 1 shows a utility meter 100 as may be described herein. The utility meter 100 may be configured to monitor utility usage for a structure such as a residence or a business. The utility meter 100 may be suitable for electrical, water, gas, and any other type of metered utility and the like. The utility meter may be a smart meter or an advance meter configured to identify consumption in greater detail than a conventional mechanical meter. Such a utility meter 100 may facilitate real time or near real time consumption readings, power outage notification, and/or power quality monitoring and the like. Many different types of utility meters may be used herein.

The utility meter 100 may include a main meter electronics board 110. The main meter electronics board 110 may include any number of processors 120 thereon. The processors 120 generally may be of conventional design. The processors 120 may include any number of software applications or modules that facilitate the execution of computer readable instructions so as to control the operation of the overall utility meter 100. The main meter electrical board 110 also may include any number of other devices associated with or internal to the processors 120. Such devices may include different types of memory devices, network interface or communication devices, operating systems, sensors, and the like. Other components and other configurations may be used herein.

The utility meter 100 also may include a name plate carrier 130. The name plate carrier 130 may include a name plate 135 with identification information related to the utility meter 100. An interface device such as an LED screen also may be used to display information as desired. The main meter electric board 110 and the name plate carrier 130 may be positioned about one or more bases 140 and within a bezel 150 and the like. A cover 160 may surround all of the components herein. A number of terminal blades 170 may place the utility meter 100 in communication with a utility 180 and a load 190 to be measured. Other components and other configurations may be used herein.

As described above, the utility meter 100 also may include a remote disconnect switch 200. Activation of the remote disconnect switch 200 will disconnect the utility meter 100 and the load 190 from the utility 180. The remote disconnect switch 200 may be positioned on the base 140 and in communication with the main meter electrical board 110 and the processors 120. The remote disconnect switch 200 may include any structure that mechanically and/or electrically breaks the electrical circuit therein.

Figure 2:
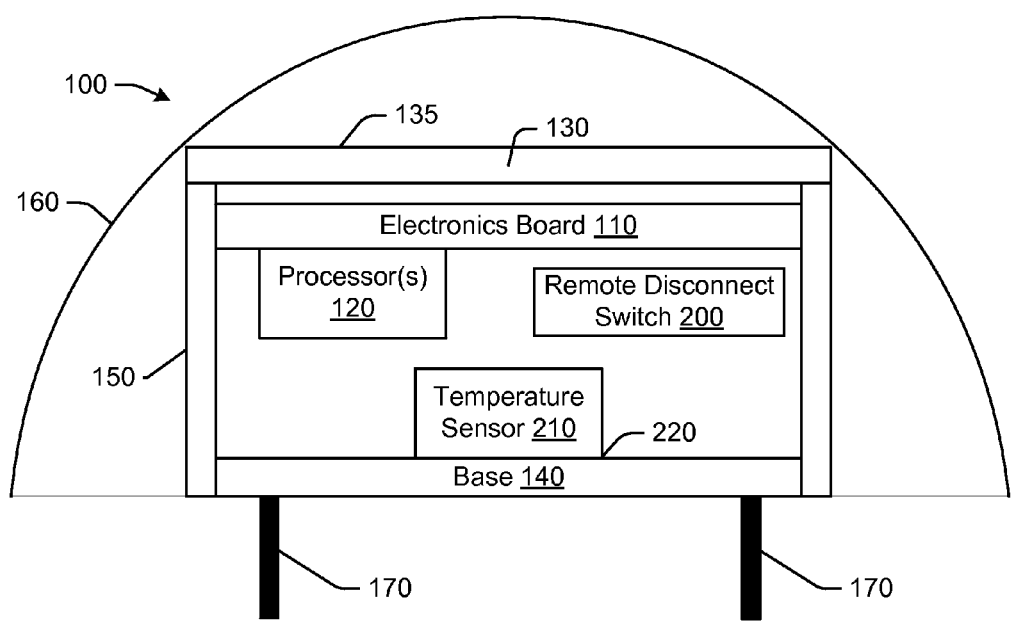
FIG. 2 is a side view of an alternative embodiment of a utility meter as may be described herein.
Figure 3:
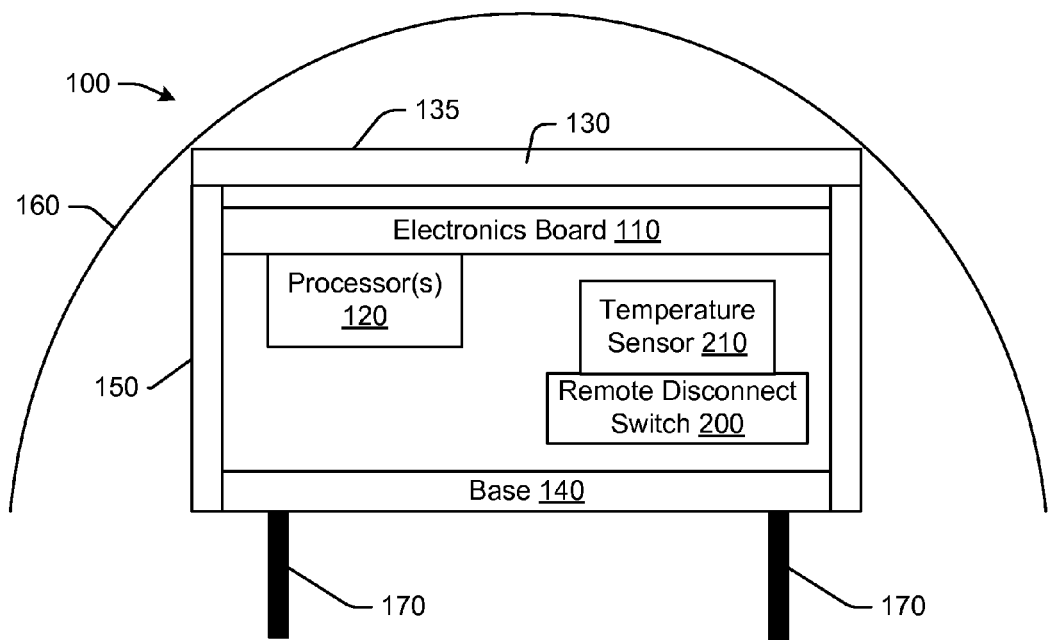
FIG. 3 is a side view of an alternative embodiment of a utility meter as may be described herein.

The utility meter 100 thus also includes one or more temperature sensors 210 in communication with the remote disconnect switch 200. In the example of FIG. 1, the temperature sensor 210 may be positioned on the main meter electrical board 110. In the example of FIG. 2, the temperature sensor 210 is positioned about the base 140. In FIG. 3, the temperature sensor 210 is positioned on or adjacent to the remote disconnect switch 200. In any of these embodiments, the temperature sensor 210 can sense the temperature about the base 140. The temperature sensor 210 may be attached to the main meter electrical board 110, the base 140, or the remote disconnect switch 200 via a thermal epoxy 220. The thermal epoxy 220 may assist with thermal conduction as well as firmly mounting the temperature sensor 210 thereon. Any number of temperature sensors 210 may be used herein. Other components and other configurations may be used herein.

Figure 4:
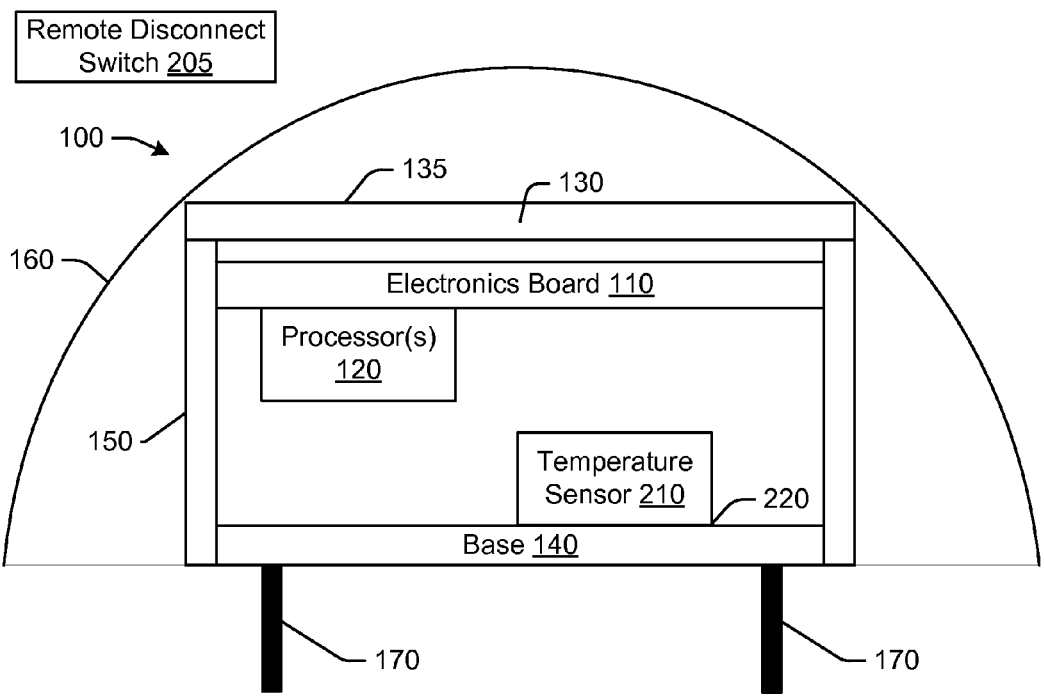
FIG. 4 is a side view of an alternative embodiment of a utility meter as may be described herein.

In addition to the use of the remote disconnect switch 200 within the meter 100 itself, an external remote disconnect switch 205 also may be used. As is shown in FIG. 4, the external remote disconnect switch 205 may be positioned apart from the main meter electronics board 110 but in communication with the load 190 or otherwise so as to break the circuit.

Figure 5:
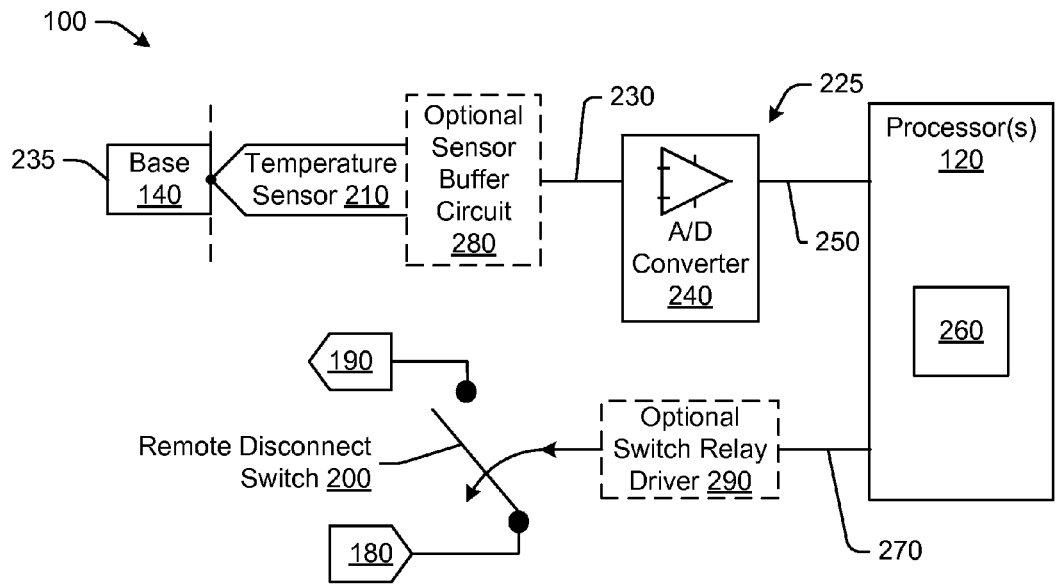
FIG. 5 is a schematic view of the utility meter of FIG. 1.

FIG. 5 shows the operation of the temperature sensor 210 in a temperature monitoring circuit 225. The temperature sensor 210 may output an analog voltage signal 230 based upon a temperature 235 of the base 140. A comparator, an A/D converter 240, and the like may convert the analog voltage signal 230 to a digital signal 250. The digital signal 250 may be received by the processor 120. The temperature 235 of the base 140 thus may be compared to a predetermined threshold temperature range 260 or other type of data structure and the like. The processor 120 may instruct the remote disconnect switch 200 to open via a disconnect signal 270 such that the utility meter 100 is disconnected from the utility 180 if such threshold temperatures are exceed or other type of predetermined condition is met. For example, other parameters may include the rate of temperature change such that the disconnect signal 270 may be provided if an increase of a given number of degrees is detected within a given time frame. Other types of parameters may be used herein.

Figure 6:
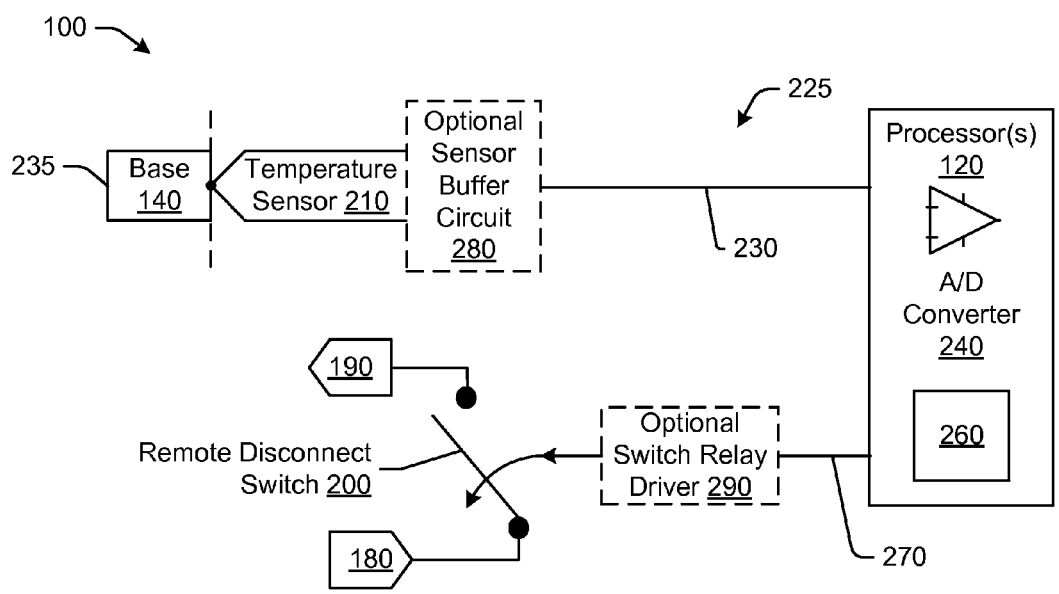
FIG. 6 is a schematic view of an alternative embodiment of a utility meter as may be described herein.

An optional sensor buffer circuit 280 also may be used herein. Likewise, an optional switch relay driver 290 also may be used herein. As is shown in FIG. 6, the A/D converter 240 may be built into the processor 120. Other components and other configurations may be used herein.

Figure 7:
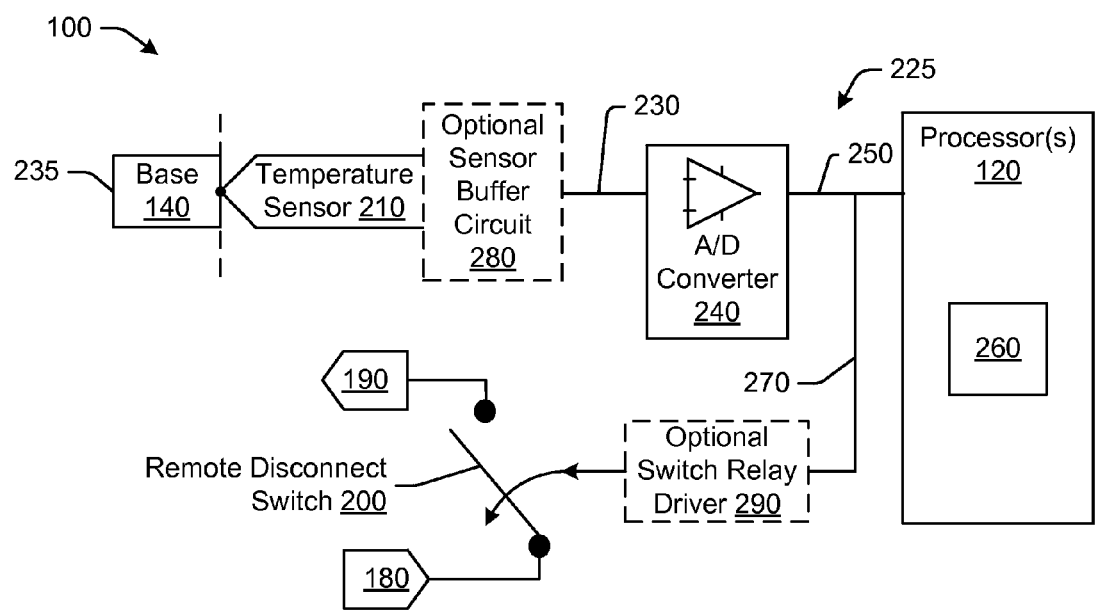
FIG. 7 is a schematic view of an alternative embodiment of a utility meter as may be described herein.

The processor 120 may be one of those on the main meter electrical board 110 or a separate processor 120 in a stand alone monitoring circuit and the like also may be used. Likewise, the processor 120 may be remote from the utility meter 100 and in communication via a network and the like. As is shown in FIG. 7, the temperature monitoring circuit 225 may directly drive the switch relay 290 or otherwise drive the remote disconnect switch 200 without notifying the processor 120. Likewise, the processor 120 may be optionally notified in real time or at a later time. The temperature monitoring circuit 225 may be in direct communications with the utility 180 or other source.

The temperature monitoring circuit 225 of the utility meter 100 described herein thus prevents the base 140 from exceeding threshold temperatures due to the remote disconnect switch 200 or otherwise through the use of the temperature sensor 210. As such, the internal temperatures of the utility meter 100 will remain below the threshold temperatures 260 that may create a possibly dangerous situation. The utility meter 100 generally may not be reconnected to the utility 180 until certain types of inspections and/or diagnostics are completed. Reconnection functionality may be greatly varied.

Figure 8:
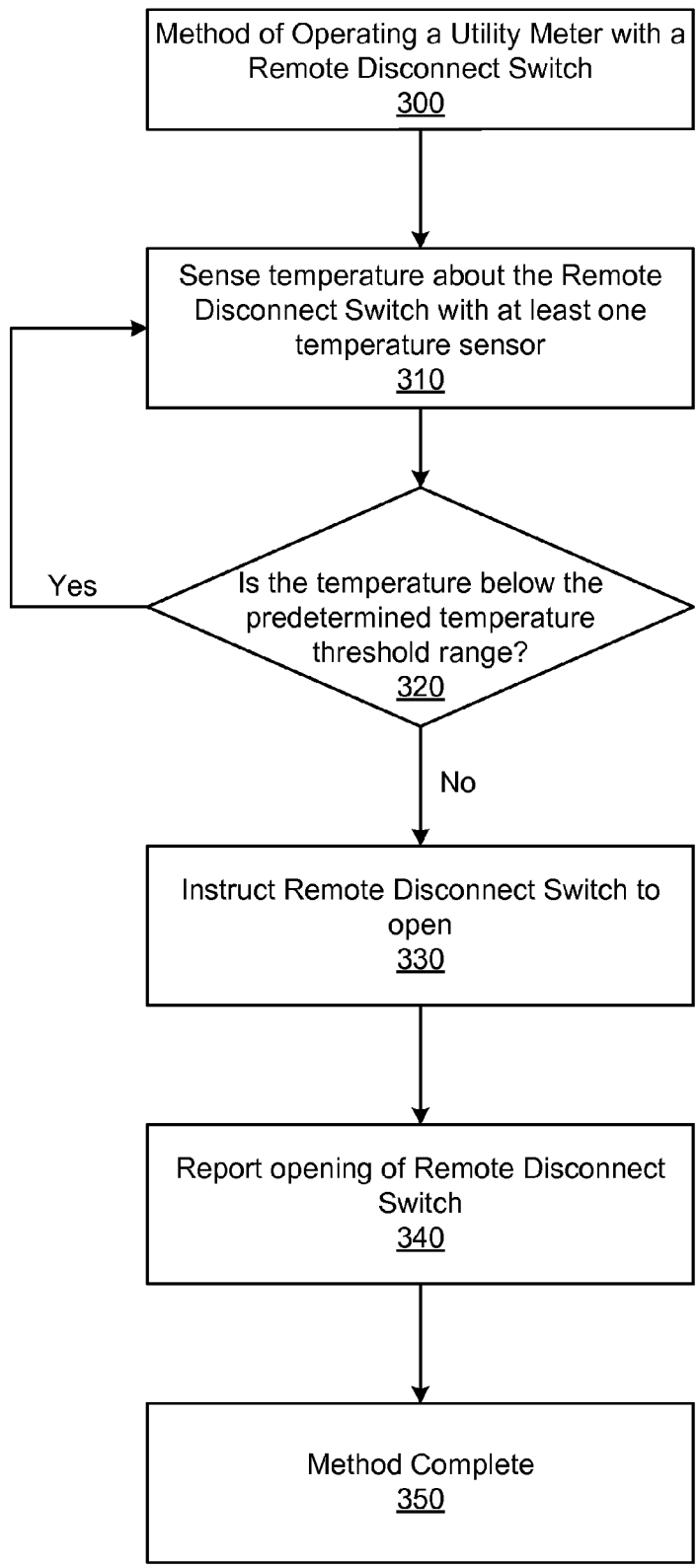
FIG. 8 is a flow chart of several of the method steps that may be used with the utility meter described herein.

FIG. 8 shows a flow chart of several method steps that may be used in the temperature monitoring circuit 225. The process may begin at step 300. At step 310, the temperature sensor 210 senses the temperature 235 about the base 140 or other location. The temperature sensor 210 outputs the analog signal 230 that is converted to the digital signal 250 by the A/D converter 240. The digital signal 250 then may be compared to the predetermined threshold temperature range 260 or other type of information at step 320. If the temperature, as represented by the digital signal 250, is below the predetermined threshold range 260, the method may return to step 310 for further temperature readings. If the temperature exceeds the predetermined threshold range 260, the processor 250 may issue the disconnect signal 270 so as to instruct the remote disconnect switch 200 to open at step 330. The processor 120 then may report the event at step 340 as desired. Alternatively, the processor 120 may be bypassed such that the remote disconnect switch 200 is directed connected within the temperature monitoring circuit 225. The method may end at step 350. The flow chart shown herein is for the purpose of example only. Similar methods may be used herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A utility meter, comprising:
    a processor with a predetermined temperature range;
    a remote disconnect switch in communication with the processor;
    at least one terminal blade in communication with a utility;
    a base positioned separately from the processor and adjacent to the at least one terminal blade; and
    a temperature sensor configured to determine a temperature of the base, the temperature sensor positioned on the base and in communication with the processor;
    wherein the processor opens the remote disconnect switch when the temperature sensor senses a temperature of the base that exceeds the predetermined temperature range.

2. The utility meter of claim 1, wherein the processor is positioned about an electronics board.

3. The utility meter of claim 1, wherein the remote disconnect switch is positioned about the base.

4. The utility meter of claim 1, wherein the temperature sensor is positioned about the remote disconnect switch.

5. The utility meter of claim 1, further comprising a plurality of temperature sensors.

6. The utility meter of claim 1, wherein the remote disconnect switch is positioned between a utility and a load.

7. The utility meter of claim 1, wherein the temperature sensor is positioned via a thermal epoxy.

8. The utility meter of claim 1, wherein the processor, the remote disconnect switch, and the temperature sensor are in communication via a temperature monitoring circuit.

9. The utility meter of claim 8, wherein the temperature monitoring circuit receives an analog signal produced by the temperature sensor.

10. The utility meter of claim 9, wherein the temperature monitoring circuit comprises an A/D converter to convert the analog signal to a digital signal for use in the processor.

11. The utility meter of claim 8, wherein the processor issues a disconnect signal via the temperature monitoring circuit.

12. The utility meter of claim 8, wherein the temperature monitoring circuit comprises a sensor buffer circuit and a switch relay driver.

13. The utility meter of claim 1, wherein the remote disconnect switch further opens based on an increase in temperature within a predetermined period of time.

14. A method of operating a utility meter with a remote disconnect switch, comprising:
    sensing temperatures about the remote disconnect switch with at least one temperature sensor on a base of the utility meter;
    comparing, by a processor of the utility meter, the sensed temperatures with a predetermined threshold range; and
    issuing, by the processor, a disconnect signal to the remote disconnect switch if the sensed temperatures exceed the predetermined threshold range, the disconnect signal causing the remote disconnect switch to disconnect a first terminal blade in connection with a utility from a second terminal blade in connection with a load;
    wherein the remote disconnect switch is positioned about the base of the utility meter;
    the base is positioned adjacent to at least one of the first and second terminal blades and separate from the processor.

15. A utility meter, comprising:
    a remote disconnect switch positioned about a base, the base positioned adjacent to at least one terminal blade of the utility meter and separate from a processor of the utility meter;
    a temperature sensor positioned on the base; and
    the processor, the remote disconnect switch, and the temperature sensor in communication via a temperature monitoring circuit such that the remote disconnect switch opens and disconnects a first terminal blade of the utility meter in connection with a utility from a second terminal blade of the utility meter in connection with a load when the processor determines that the temperature sensor senses a temperature that exceeds a predetermined temperature range.

16. The utility meter of claim 15, wherein the temperature sensor is positioned about the remote disconnect switch.

17. The utility meter of claim 15, wherein the remote disconnect switch further opens based on an increase in temperature within a predetermined period of time.

* * * * *